(12) United States Patent
Okubo et al.

(10) Patent No.: US 10,937,329 B2
(45) Date of Patent: Mar. 2, 2021

(54) LEARNER ENGAGEMENT IN AN ONLINE EDUCATIONAL SYSTEM

(71) Applicant: FUJITSU LIMITED, Kawasaki (JP)

(72) Inventors: Yuko Okubo, Berkeley, CA (US); Ajay Chander, San Francisco, CA (US)

(73) Assignee: FUJITSU LIMITED, Kawasaki (JP)

( * ) Notice: Subject to any disclaimer, the term of this patent is extended or adjusted under 35 U.S.C. 154(b) by 598 days.

(21) Appl. No.: 15/668,148

(22) Filed: Aug. 3, 2017

(65) Prior Publication Data

US 2019/0043377 A1 Feb. 7, 2019

(51) Int. Cl.
| | |
|---|---|
| *G09B 5/10* | (2006.01) |
| *G09B 5/06* | (2006.01) |
| *G09B 5/14* | (2006.01) |
| *G06F 16/35* | (2019.01) |
| *G06F 16/36* | (2019.01) |
| *G09B 19/00* | (2006.01) |

(52) U.S. Cl.
CPC ............. *G09B 5/10* (2013.01); *G06F 16/35* (2019.01); *G06F 16/367* (2019.01); *G09B 5/06* (2013.01); *G09B 5/14* (2013.01); *G09B 19/00* (2013.01)

(58) Field of Classification Search
CPC . G09B 5/06; G09B 5/14; G09B 19/00; G09B 5/10; G06F 16/35; G06F 16/367
See application file for complete search history.

(56) References Cited

U.S. PATENT DOCUMENTS

| | | | | |
|---|---|---|---|---|
| 6,606,480 B1* | 8/2003 | L'Allier | ................... | G09B 7/02 434/219 |
| 7,191,139 B2* | 3/2007 | Roy | ................... | G06Q 10/1053 705/321 |
| 8,398,490 B1* | 3/2013 | Phelon | ................... | G06Q 10/06 463/42 |
| 2004/0219493 A1* | 11/2004 | Phillips | ................... | G09B 5/06 434/118 |
| 2011/0053126 A1* | 3/2011 | Bielenberg | ........... | G09B 29/106 434/219 |

(Continued)

OTHER PUBLICATIONS

DonorsChoose.org (2000-2017). Retrieved Aug. 3, 2017, from https://www.donorschoose.org/.

(Continued)

*Primary Examiner* — Malina D. Blaise
(74) *Attorney, Agent, or Firm* — Maschoff Brennan

(57) ABSTRACT

An embodiment includes a method of learner engagement that includes crowdsourcing a skill proposal. The skill proposal is crowdsourced and includes a skill item that describes an exercise related to an educational concept. The method may include crowdsourcing a real-world problem proposal. The real-world problem proposal may include a real-world problem item that includes one or more technical issues that occur in at least one career. The method may include determining whether the skill item is relevant to the real-world problem item based on application of the educational concept of the skill item to technical issues of the real-world problem item. In response to a determination that the skill item is relevant to the real-world problem item, the method may include pairing the skill item with the real-world problem item.

15 Claims, 12 Drawing Sheets

(56) References Cited

U.S. PATENT DOCUMENTS

| | | | | |
|---|---|---|---|---|
| 2012/0156667 | A1* | 6/2012 | Singer | G09B 5/00 434/350 |
| 2013/0273517 | A1* | 10/2013 | Lettrick | G09B 7/00 434/362 |
| 2014/0057242 | A1* | 2/2014 | Sherman | G09B 7/00 434/353 |
| 2014/0120511 | A1* | 5/2014 | Hall | G09B 5/14 434/350 |
| 2014/0149233 | A1* | 5/2014 | Dai | G06Q 30/0277 705/14.73 |
| 2014/0242565 | A1* | 8/2014 | Abts | G09B 5/00 434/350 |
| 2015/0242979 | A1* | 8/2015 | Abts | G09B 5/00 705/328 |
| 2015/0248840 | A1* | 9/2015 | Aldazabal | G09B 5/065 434/219 |
| 2015/0346937 | A1* | 12/2015 | Mahmoudian-Bidgoly | G06F 3/04812 715/753 |
| 2016/0012739 | A1* | 1/2016 | Jafari | G09B 5/06 434/353 |
| 2019/0189020 | A1* | 6/2019 | Punia | G06N 20/20 |
| 2019/0279522 | A1* | 9/2019 | Jafari | G09B 7/00 |

OTHER PUBLICATIONS

GoFundMe (2010-2017). Retrieved Aug. 3, 2017, from https://www.gofundme.com/.
ScholarMatch, Inc. (2017). Retrieved Aug. 3, 2017, from https://scholarmatch.org/.
Real Time Farms (2017). Real Time Farms Blog. Retrieved Aug. 3, 2017, from https://blog.realtimefarms.com/.
AdoptAClassroom.org (2017). Retrieved Aug. 3, 2017, from https://www.adoptaclassroom.org/home-search/?utm_expid=82pXQU3u0GiGnb_9_j_j0A.1&utm_referrer=https%3A%2F%2Fwww.google.com%2F.
IncitED: The Crowdfunding Community for Education (2017). Retrieved Aug. 3, 2017, from http://incitedcrowdfundingeducation.tumblr.com/.
Duolingo (2017). Retrieved Aug. 3, 2017, from https://www.duolingo.com/.
RakutenVIKI (2017). Retrieved Aug. 3, 2017, from https://www.viki.com/?locale=en.
Khan Academy (2017). Retrieved Aug. 3, 2017, from https://www.khanacademy.org/.
Amara (2017). Retrieved Aug. 3, 2017, from https://amara.org/en/.
Course Hero, Inc. (2017). Retrieved Aug. 3, 2017, from https://www.coursehero.com/.
MentorMob (2015). Retrieved Aug. 3, 2017, from https://www.mentormob.com/.
Academic Room (2013). Retrieved Aug. 3, 2017, from http://www.academicroom.com/.
The Big Think, Inc. (2017). Retrieved Aug. 3, 2017, from http://bigthink.com/.
Coworks (2017). Retrieved Aug. 3, 2017, from https://coworks.com/.
TermWiki (2017). Retrieved Aug. 3, 2017, from http://en.termwiki.com/.

* cited by examiner

LEARNER ENGAGEMENT IN AN ONLINE EDUCATIONAL SYSTEM

FIELD

The embodiments discussed herein are related to learner engagement in an online educational system.

BACKGROUND

Student motivation to engage in traditional teaching curricula and systems is low. The lack of motivation negatively affects educational outcomes. In particular, students are taught using educational concepts without a provision of practical reasons to learn the educational concepts and without understanding why studying such educational concepts are beneficial to the student.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of learner engagement that includes crowdsourcing, by the educational server, a skill proposal from one or more users of an online educational system. The skill proposal may be crowdsourced via a communication network. The skill proposal may include a skill item that describes an exercise related to an educational concept. The method may include organizing, by the educational server, the skill item included in the skill proposal relative to other skill items that are stored in a skill database. The skill item may be organized with the other skill items in a topic-based hierarchy. The method may include storing, by the educational server, the skill item in the skill database according to the organization. The method may include crowdsourcing, by the educational server, a real-world problem proposal from the one or more users. The real-world problem proposal may be crowdsourced via the communication network. The real-world problem proposal may include a real-world problem item that includes one or more technical issues that occur in at least one career. The method may include storing, by the educational server, the real-world problem item in a problem solving database. The method may include determining, by the educational server, whether the skill item is relevant to the real-world problem item based on application of the educational concept of the skill item to technical issues of the real-world problem item. In response to a determination that the skill item is relevant to the real-world problem item, the method may include pairing, by the educational server, the skill item with the real-world problem item.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Many students or other individuals are taught through presentation of educational concepts. The presentation of educational concepts are, in many circumstances, presented using computing technologies such as the Internet and/or computer systems. The presentation of such educational concepts, however, may not include any relationship between the educational concepts to practical implementations of the educational concepts. Additionally, the educational concepts may be presented without any relationship to careers in which the educational concepts are used. Moreover, educators, such as teachers or instructors, may not be well-suited to provide the relationships between the educational concepts and the practical implementations. Accordingly, some current educational environments, while incorporating the use of computing technologies, may be deficient in providing proper motivation to students to learn educational concepts and in guidance as to which educational concepts may be applicable to a career.

Accordingly, embodiments described in this disclosure include a technical solution to the above shortcomings in traditional educational systems. Some embodiments include an online educational system that is configured to engage learners. Engagement of learners may be accomplished through connection between educational concepts, careers, and real-world problems. The educational concepts may be represented in skill items, the real-world problems may be represented by real-world problem items, and the careers may be represented by career items. The skill items, the real-world problem items, the career items, or some combination thereof may be paired. In response to inquiries submitted by users of the online educational system such as topic inquiries or career inquiries, the skill items, the real-world problem items, and the career items may be communicated to or accessed together. Accordingly, a learner may view the skill items, the real-world problem items, and the career items together, which may link an educational concept to the real-world problems and the career, which may motivate the learner. This and other embodiments are described with reference to the appended figures. In the figures, use of like item numbers with components and features indicates like structure unless otherwise described.

Figure 1:
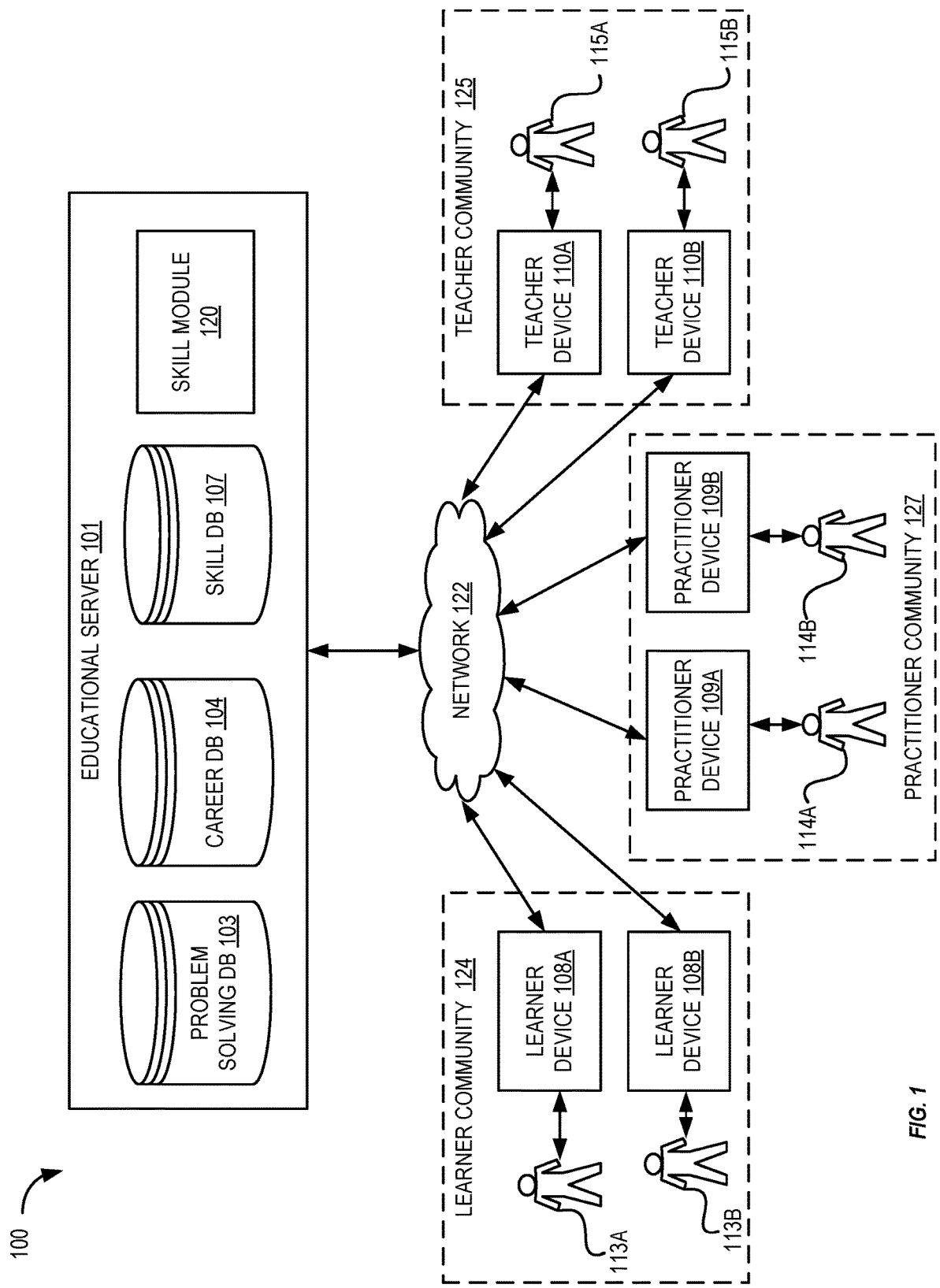
FIG. 1 illustrates an example online educational system in which some embodiments described in this disclosure may be implemented.

FIG. 1 illustrates an example online educational system 100. The online educational system 100 may be configured for engagement of learners 113A and 113B (generally, learner 113 or learners 113). The online educational system 100 may be configured to convert a perceived value of skills that are being taught by teachers 115A and 115B (generally, teacher 115 and teachers 115). The conversion of the perceived value of the skills may be accomplished through pairing skills with real-world problems and/or careers by an educational server 101. Through interaction between the learners 113 and the educational server 101, the learners 113 may be exposed to the careers and/or the real-world problems that are paired with skills. The exposure of the careers and/or the real-world problems may motivate the learners 113 to master the skills.

For example, one of the learners 113 may be learning the fractions in a class taught by one of the teachers 115. The teacher 115 may interact with the educational server 101 to expose the learner 113 to real-world problems that involve fractions (e.g., building fence, baking a cake, etc.) and to careers in which the real-world problems occur (e.g., a construction career, cooking career, etc.). The learner 113 may have an interest in one of the careers and the real-world problems may provide tangible example of the skills that are related to the career. Accordingly, the learner 113 may be motivated to study fractions.

The information included or stored by the educational server 101 may be crowdsourced from a learner community 124, a teacher community 125, and a practitioner community 127. As used in this disclosure, the term 'crowdsourced' indicates that the educational server 101 obtains information and data that are submitted or communicated from the learner community 124, the teacher community 125, and the practitioner community 127 via a communication network (network 122).

The learner community 124 may include the learners 113 who may be associated with a learner device 108A and 108B. The teacher community 125 may include the teachers 115 who may be associated with a teacher device 110A and 110B. The practitioner community 127 may include practitioners 114A and 114B (generally, practitioner 114 or practitioners 114). The practitioners 114 may be associated with a practitioner device 109A and 109B. The devices 108A, 108B, 109A, 109B, 110A, and 110B are collectively referred to as devices 108/109/110.

The devices 108/109/110 may be communicatively coupled to the educational server 101 via the network 122. The learners 113 may accordingly communicate data and information to the educational server 101 and receive data and information from the educational server 101 via the network 122 using the learner devices 108. Similarly, the teachers 115 may communicate data and information to the educational server 101 and receive data and information from the educational server 101 via the network 122 using the teacher devices 110. Likewise, the practitioners 114 may communicate data and information to the educational server 101 and receive data and information from the educational server 101 via the network 122 using the practitioner devices 109.

The devices 108/109/110 may include any computing system that includes a processor, memory, and computing capabilities. In the illustrated embodiments, the devices 108/109/110 may be coupled to the network 122 to send and receive information with one or more of the environment components via the network 122. For example, the devices 108/109/110 may be configured to communicate skill proposals, real-world problem proposals, general inquiries, answers, upvotes, and the like to the educational server 101. In addition, the devices 108/109/110 may be configured to receive or access information and data that is stored on the educational server 101. The devices 108/109/110 may display or cause the display of the feasible schedules and/or the total. For example, the devices 108/109/110 may be receive or access electronic messages, answers, general inquired, skill items, real-world problem items, and career items. In some embodiments, display of data and information accessed or received by the devices 108/109/110 may be performed on a user interface device of the devices 108/109/110. Additionally, some of the data and information accessed or received by the devices 108/109/110 may be displayed in a forum that is hosted by the educational server 101. Some examples of the devices 108/109/110 may include a smart phone, a desktop computer, and the like.

The network 122 may include wired or wireless configurations, and may have configurations including a star configuration, token ring configuration, or other configurations. Furthermore, the network 122 may include a local area network (LAN), a wide area network (WAN) (e.g., the Internet), and/or other interconnected data paths across which multiple devices may communicate. In some embodiments, the network 122 may include a peer-to-peer network. The network 122 may also be coupled to or include portions of a telecommunications network that may enable communication of data in a variety of different communication protocols.

In some embodiments, the network 122 includes BLUETOOTH® communication networks and/or cellular communications networks for sending and receiving data including via short messaging service (SMS), multimedia messaging service (MMS), hypertext transfer protocol (HTTP), direct data connection, wireless application protocol (WAP), e-mail, etc.

The educational server 101 may include a hardware server that includes a processor, memory, and communication capabilities. In the illustrated embodiments, the educational server 101 may be coupled to the network 122 to send and receive data and information to and from the devices 108/109/110 via the network 122.

The educational server 101 may include a problem solving database 103, a career database 104, a skill database 107, and a skill module 120. In the figures, database is abbreviated as 'DB'. The problem solving database 103, the career database 104, and the skill database 107 may include any storage system or storage device. For example, the problem solving database 103, the career database 104, and the skill database 107, may include computer-readable storage media such as tangible or non-transitory computer-readable storage media. The tangible or non-transitory computer-readable storage media may include RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer.

The skill database 107 may be configured to store skill items. The skill items describe and exercise related to an educational concept. An example of a skill item may include a set of problems such as a set of fraction multiplication problems. In this example, the exercise includes the problems, which the learner 113 is to execute, and the educational concept is fraction multiplication. Other examples of a skill item may include quadratic equation problems, diagraming sentences, literary themes, story analyses, medical routines, and the like.

The skill items may be organized in the skill database 107 according to a topic-based hierarchy. In the topic-based hierarchy, broader concepts are organized in levels of the topic-based hierarchy above levels that include narrower concepts. The narrower concepts may be sub-topics of the topics in the higher levels. For example, in the topic-based hierarchy, a topic of 'math' may be a broader topic and 'fraction multiplication' may be a sub-topic of 'math'.

The skill items stored in the skill database 107 may be crowdsourced from the learner community 124, the teacher community 125, and the practitioner community 127. In some embodiments, the skill items may be included in skill proposals that are crowdsourced from the learner community 124, the teacher community 125, and the practitioner community 127.

The problem solving database 103 may be configured to store real-world problem items. The real-world problem items may include one or more technical issues that occur in at least one career. The real-world problem items may include an application of one or more of the skill items. For instance, the skill item may include the fraction multiplication problems. The real-world problem items may include a construction problem involving multiplication of fractions.

The real-world problem items stored in the problem solving database 103 may be crowdsourced from the learner community 124, the teacher community 125, and the practitioner community 127. In some embodiments, the real-world problem items may be included in real-world problem proposals that are crowdsourced from the learner community 124, the teacher community 125, and the practitioner community 127.

The career database 104 may be configured to store real-world problem items with relationship to career items. The career items may represent careers. For example, a construction career may be represented in the career database 104 by a construction career item. One or more real-world problem items that occur in the career represented by the career item may be stored in the career database 104 relative to the corresponding career item. Continuing from the above example, one or more real-world problem items such as measuring framing for a housing addition, determining material costs for a project, etc. may be stored in the career database 104 relative to the construction career item.

The career item, the skill item, and the real-world problem item may include data or information that may be stored or represented by any appropriate data structure in one or more of the problem solving database 103, the career database 104, and the skill database 107.

The skill module 120 may be configured to store the career item, the skill item, and the real-world problem item. In addition, the skill module 120 may be configured to determine relationships between the career item, the skill item, and the real-world problem item and pair the career item, the skill item, and the real-world problem item based on the relationships.

For example, in some embodiments the skill module 120 may crowdsource or receive a skill proposal via the network 122. The skill proposal may include a skill item that describes an exercise related to an educational concept. The skill module 120 may organize the skill item included in the skill proposal relative to other skill items that are stored in the skill database 107. The skill item may be organized with the other skill items in a topic-based hierarchy. The skill module 120 may store the skill item in the skill database 107 according to the organization. The skill module 120 may crowdsource a real-world problem proposal via the network 122. The real-world problem proposal may include a real-world problem item that includes one or more technical issues that occur in at least one career. The skill module 120 may store the real-world problem item in the problem solving database 103.

The skill module 120 may determine whether the skill item is relevant to the real-world problem item based on application of the educational concept of the skill item to technical issues of the real-world problem item. In response to a determination that the skill item is relevant to the real-world problem item, the skill module 120 may pair the skill item with the real-world problem item. The skill module 120 may identify a career in which the real-world problem item occurs. The skill module 120 may further pair one or more career items in the career database 104 that correspond to the career in which the real-world problem item occurs with the real-world problem item and the skill item. The skill module 120 may be configured to store the real-world problem item in the career database 104.

In addition, the skill module 120 may be configured to receive messages from the learner community 124, the teacher community 125, and the practitioner community 127. The skill module 120 may then communicate or enable access to electronic messages representative of the messages.

The skill module 120 may be implemented using hardware including a processor, a microprocessor (e.g., to perform or control performance of one or more operations), a field-programmable gate array (FPGA), or an application-specific integrated circuit (ASIC). In some other instances, the skill module 120 may be implemented using a combination of hardware and software. Implementation in software may include rapid activation and deactivation of one or more transistors or transistor elements such as may be included in hardware of a computing system (e.g., the devices 108/109/110). Additionally, software defined instructions may operate on information within transistor elements. Implementation of software instructions may at least temporarily reconfigure electronic pathways and transform computing hardware.

Modifications, additions, or omissions may be made to the online educational system 100 without departing from the scope of the present disclosure. The present disclosure may apply to online educational system that may include one or more educational servers 101, one or more networks 122, and one or more devices 108/109/110 associated with one or more learners 113, one or more teachers 115 and one or more practitioners 114 or any combination thereof.

Moreover, the separation of various components in the embodiments described herein is not meant to indicate that the separation occurs in all embodiments. It may be understood with the benefit of this disclosure that the described components may be integrated together in a single component or separated into multiple components.

Figure 2:
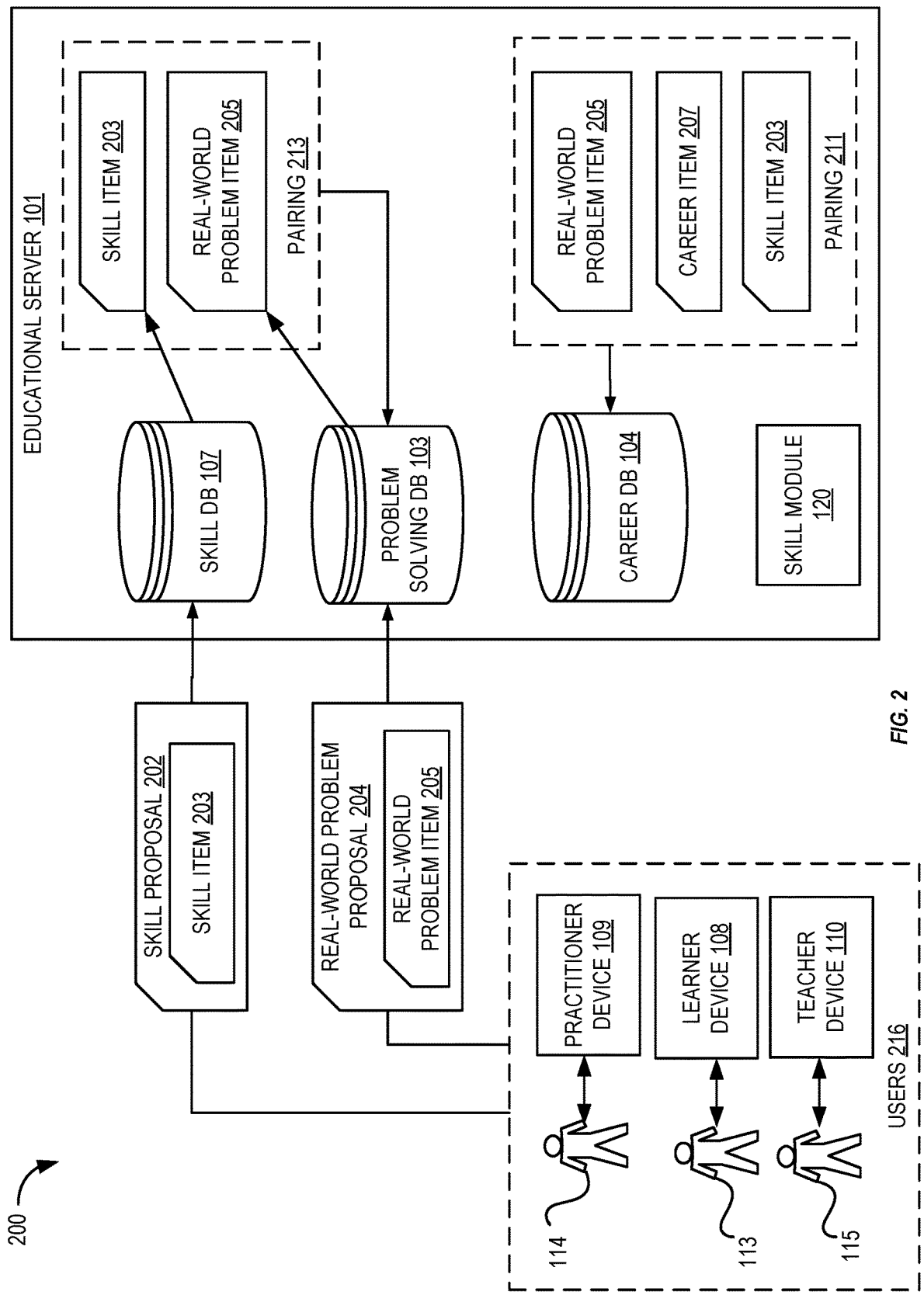
FIG. 2 illustrates an example pairing process that may be implemented in the online educational system of FIG. 1.

FIG. 2 illustrates an example pairing process 200 that may be implemented in the online educational system 100 of FIG. 1. The pairing process 200 may be involved in engaging the learners 113. The pairing process 200 generally determines relationships between skill items 203, real-world problem items 205, and career items 207. Based on the relationships, the skill items 203, the real-world problem items 205, and the career items 207 are paired. As described with reference to FIG. 3, following the pairing of the skill items 203, real-world problem items 205, and career items 207, the learners 113 may be exposed to the skill items 203, real-world problem items 205, and career items 207 together, which may convert the perceived value of the skill items 203.

FIG. 2 includes multiple components and entities (e.g., 101, 109, 108, 110, 114, 113, 115, and 113) described with reference to FIG. 1. In FIG. 2, the practitioner 114 associated with the practitioner device 109, the learner 113 associated with the learner device 108, and the teacher 115 associated with the teacher device 110 may be collectively referred to as users 216. Although not explicitly depicted in FIG. 2, communication between the users 216 and the educational server 101 may be via a communication network such as the network 122 of FIG. 1.

In the pairing process 200 of FIG. 2, one or more of the users 216 may communicate a skill proposal 202 to the educational server 101. For example, the teacher 115 or the learner 113 may submit an electrical representation of a document, data, information, etc. that includes the skill proposal 202. As described above, the skill proposal 202 may be crowdsourced by the educational server 101. Accordingly, the educational server 101 may not specifically request the skill proposal 202, but instead may accept the skill proposal 202.

The skill proposal 202 may include a skill item 203. For instance, the skill item 203 may include a portion of the skill proposal 202 that may be stored in the skill database 107. The skill item 203 may describe an exercise related to an educational concept.

The educational server 101 may receive the skill proposal 202. The skill module 120 may parse the skill item 203 from the skill proposal 202. The skill module 120 may organize the skill item 203 included in the skill proposal 202 relative to other skill items that are stored in a skill database 107. As discussed above, in some embodiments, the skill item 203 may be organized with the other skill items in a topic-based hierarchy. The skill item 203 may then be stored in the in the skill database 107 according to the organization.

Additionally, one or more of the users 216 may communicate a real-world problem proposal 204. The real-world problem proposal 204 may be crowdsourced by the educational server 101 and may be received via the communication network such as the network 122 of FIG. 1. The real-world problem proposal 204 may include a real-world problem item 205. The real-world problem item 205 may include one or more technical issues that occur in at least one career. The educational server 101 may receive the real-world problem proposal 204. The skill module 120 may parse the real-world problem item 205 from the real-world problem proposal 204. The skill module 120 may store the real-world problem item 205 in a problem solving database 103.

The skill module 120 may determine whether the skill item 203 is relevant to the real-world problem item 205. The determination may be based on application of the educational concept of the skill item 203 to technical issues of the real-world problem item 205. For example, the technical issue in the real-world problem item 205 may be solved using the educational concept included in the skill item 203.

For instance, the skill item 203 may include a set of fraction multiplication problems and the real-world problem item 205 may include a construction-based technical issue in which fraction multiplication is used to solve the technical issue. Accordingly, the skill item 203 may be determined to be relevant to the real-world problem item 205. Alternatively, the skill item 203 may include an insulin-dosing schedule and the real-world problem item 205 may include the construction-based technical issue. Accordingly, the skill item 203 may be determined to be irrelevant to the real-world problem item 205. In response to a determination that the skill item 203 is relevant to the real-world problem item 205, the skill module 120 may pair the skill item 203 with the real-world problem item 205. In FIG. 2, the skill item 203 paired with the real-world problem item 205 is shown as pairing 213.

The skill module 120 may identify a career in which the real-world problem item 205 occurs. For example, the real-world problem item 205 may include a technical issue that may be solved in the career. The identified career may be represented in the career database 104 by a career item 207. The skill module 120 may pair the career item 207 with the real-world problem item 205 and the skill item 203 that are already paired with therewith. The skill module 120 may store then real-world problem item 205 in the career database 104. The real-world problem item 205 may be stored in the career database 104 in relative to the career items 207. A pairing of the real-world problem item 205, the career item 207, and the skill item 203 is represented in FIG. 2 by pairing 211.

Figure 3:
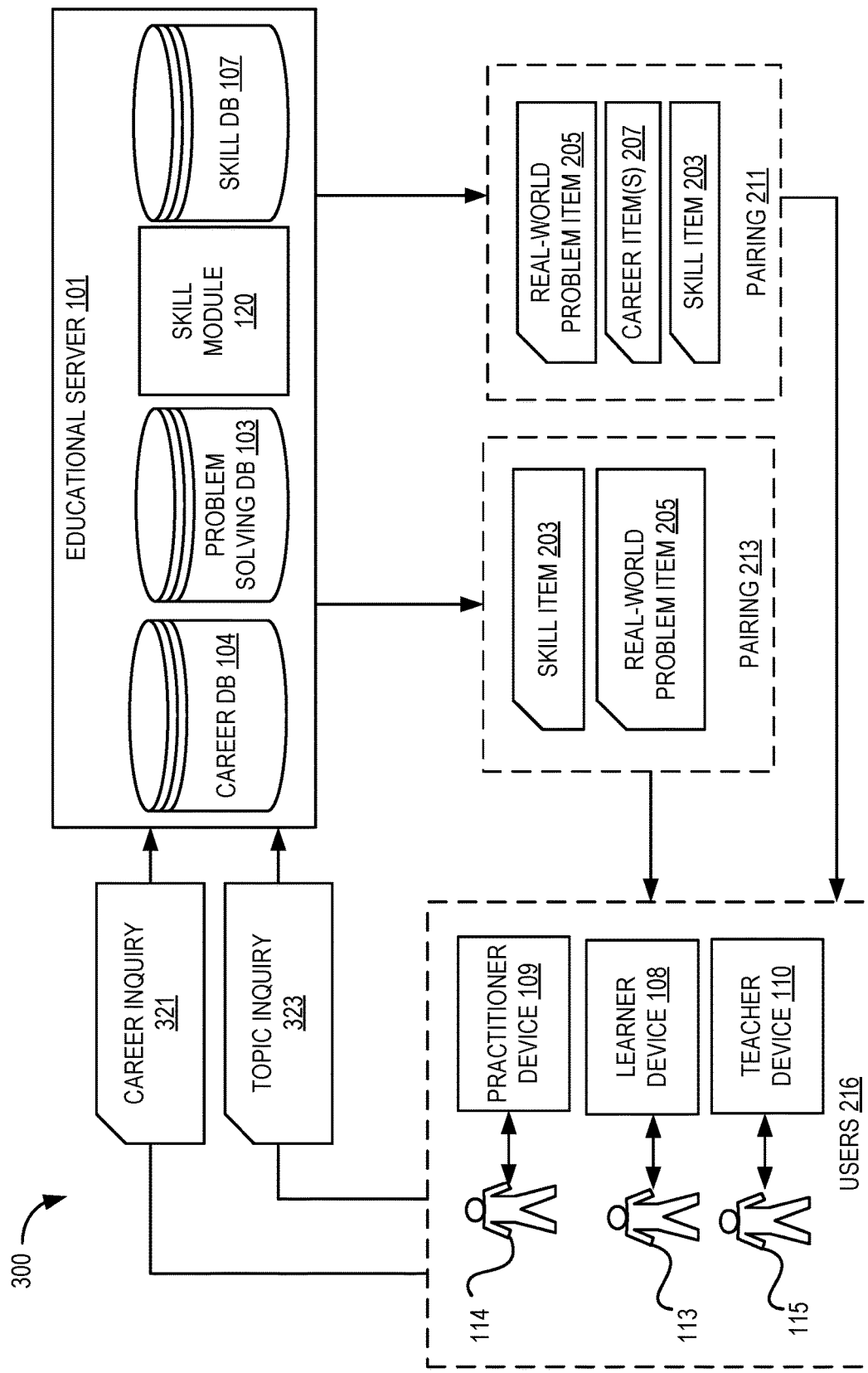
FIG. 3 illustrates an example inquiry/response process that may be implemented in the online educational system of FIG. 1.

FIG. 3 illustrates an example inquiry/response process 300 that may be implemented in the online educational system 100 of FIG. 1. The inquiry/response process 300 may occur following the pairing process 200 of FIG. 2. Generally, after the career item 207, the skill item 203, the real-world problem item 205, or some combination are paired, the paired items may be communicated together to the users 216 in response to inquiries 321 and 323. Because the career item 207, the skill item 203, the real-world problem item 205, or some combination are viewed together, the learner 113 or another user 216 may convert the perceived value of the skill items 203, which may motivate the learner 113 or the other user 216. The inquiry/response process 300 FIG. 3 is described in combination with a user interface device 504 of FIG. 5.

FIG. 3 includes multiple components and entities (e.g., 101, 109, 108, 110, 114, 113, 115, and 113) described with reference to FIGS. 1 and 2. Although not explicitly depicted in FIG. 3, communication between the users 216 and the educational server 101 may be via a communication network such as the network 122 of FIG. 1.

In FIG. 3, one or more of the users 216 may communicate a career inquiry 321 to the educational server 101. The career inquiry 321 may be communicated from the practitioner device 109, the learner device 108, or the teacher device 110. For example, the learner 113 may provide input to the learner device 108. In response, the learner device 108 may communicate the career inquiry 321 to the educational server 101.

The career inquiry 321 may include data or information that includes or identifies a career. For example, the career inquiry 321 may include one or more of the careers that corresponds to the career items in the career database 104.

The career items in the career database 104 may be paired with the skill item 203 and/or the real-world problem items 205, e.g., the pairing 211. Accordingly, the skill module 120 may receive the career inquiry 321 and may parse the information that identifies the career from the career inquiry 321. The skill module 120 may then communicate the skill item 203 and/or the real-world problem items 205 to one or more of the devices 108/109/110 or may enable access to the skill item 203 and/or the real-world problem items 205 by one or more of the devices 108/109/110. The skill item 203 and/or the real-world problem items 205 may be displayed on a user interface device, which may be included in the one or more of the devices 108/109/110.

Figure 5:
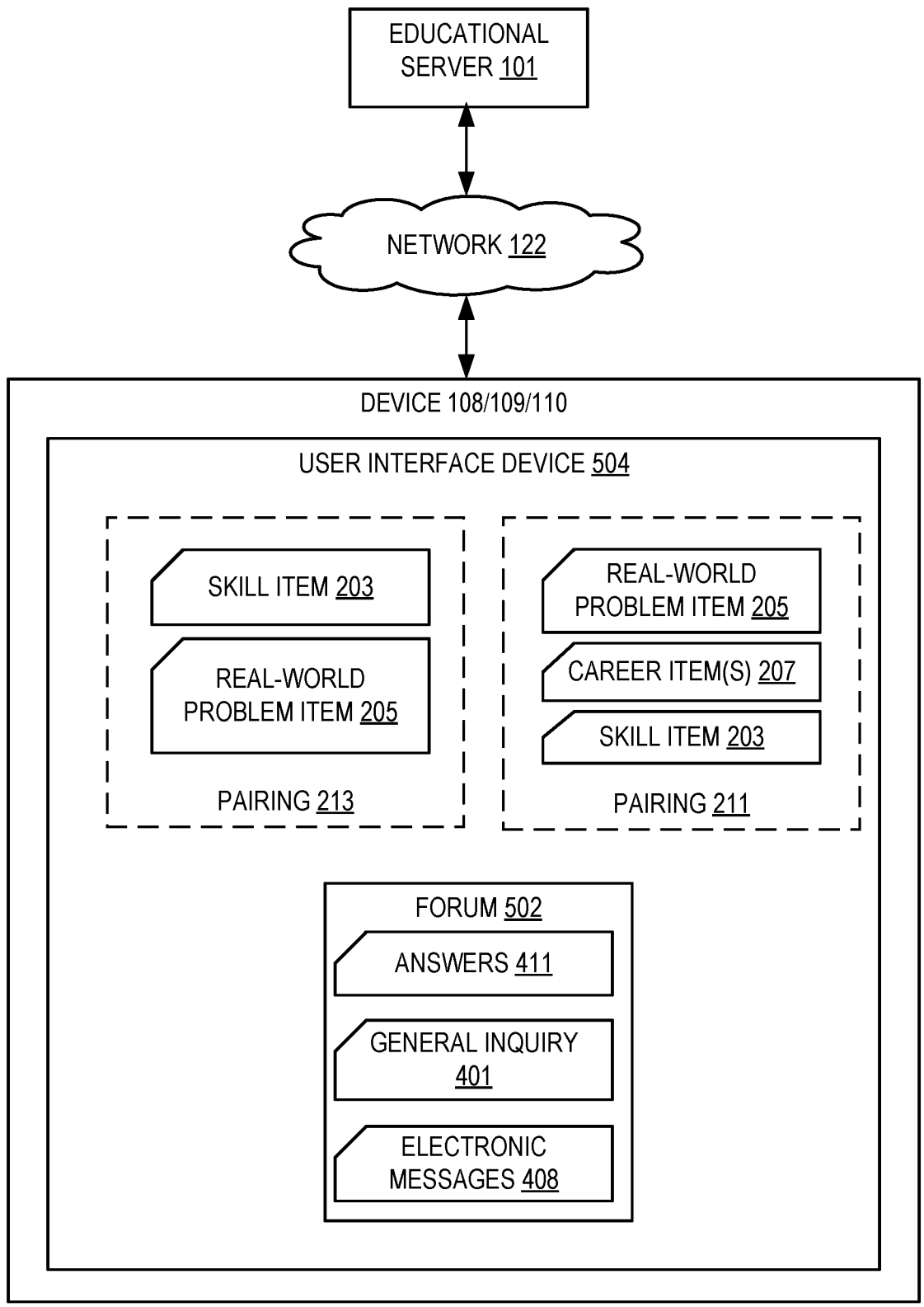
FIG. 5 illustrates an example embodiment of a user interface device that may be implemented in the online educational system of FIG. 1.

FIG. 5 illustrates an example embodiment of a user interface device 504. In the embodiment of FIG. 5, the user interface device 504 is included in the learner device 108, the teacher device 110, the practitioner device 109, or some combination thereof. In other embodiments, the user interface device 504 may be included in another computing device and/or in multiple computing devices simultaneously or substantially simultaneously. For example, the user interface device 504 may be viewed simultaneously by the learner device 108, the teacher device 110, and the practitioner device 109.

In the user interface device 504, the pairing 213, which includes the skill item 203 and the real-world problem item 205, may be displayed. For example, as described above, the educational server 101 may receive the career inquiry 321 of FIG. 3. The career inquiry 321 may include one or more of the careers in which the real-world problem item 205 occurs. In response to the career inquiry, the skill item 203 and the real-world problem item 205 may be communicated to or accessed by the device 108/109/110. At the device 108/109/110, the skill item 203 and the real-world problem item 205 may be displayed by the user interface device 504.

Accordingly, if the learner 113 of FIG. 1 is interested in a career or a career change, then the learner 113 may communicate the career inquiry 321. In response, the educational server 101 may communicate the skill item 203 and the real-world problem item 205 to the devices 108/109/110 such that the learner 113 may be exposed to the skill item 203 and the real-world problem item 205. The exposure to the skill item 203 and the real-world problem item 205 may inform the learner 113 as to skills involved in performance of the career that is included in the career inquiry 321.

Referring back to FIG. 3, one or more of the users 216 may communicate a topic inquiry 323 to the educational server 101. The topic inquiry 323 may be communicated from the practitioner device 109, the learner device 108, or the teacher device 110. For example, the teacher 115 may provide input to the teacher device 110. In response, the teacher device 110 may communicate the topic inquiry 323 to the educational server 101.

The topic inquiry 323 may include data or information that includes or identifies a skill item 203 or a topic that is included in the skill item 203. For example, the topic inquiry 323 may include a particular skill item such as a quadratic equation expression, which may be an exercise related to an educational concept. Additionally or alternatively, the topic inquiry 323 may include a topic such as "quadratic equation."

The career item 207 in the career database 104, the skill item 203 in the skill database 107, and the real-world problem item 205 in the problem solving database 103 may be paired in the pairing 211. Accordingly, the skill module 120 may receive the topic inquiry 323 and may parse the information that identifies the topic or the skill item 203 from the topic inquiry 323. The skill module 120 may then communicate the skill item 203, the real-world problem item 205, the career item 207, or some combination thereof to one or more of the devices 108/109/110. The skill item 203, the real-world problem item 205, the career item 207, or some combination thereof may be displayed on a user interface device, which may be included in the one or more of the devices 108/109/110.

Referring back to FIG. 5, in the user interface device 504, the pairing 211, which includes the skill item 203, the career item 207, and the real-world problem item 205, may be displayed. For example, as described above, the educational server 101 may receive the topic inquiry 323 of FIG. 3 via the network 122. The topic inquiry 323 may identify the skill item 203. In response to the topic inquiry 323, the skill item 203, the real-world problem item 205, the career item 207, or some combination thereof may be displayed in the user interface device 504.

Accordingly, the teacher 115 of FIG. 3 may be interested in engaging the learner 113 through a connection between the skill item 203 and the career items 207. Thus, the teacher 115 may communicate the topic inquiry 323 via the network 122. In response, the learner 113 may be exposed to the skill item 203, the real-world problem item 205, and the career item 207. The learner 113 may accordingly be inspired to study the skill item 203 because it can lead to a career that includes one of the career items 207.

Figure 4:
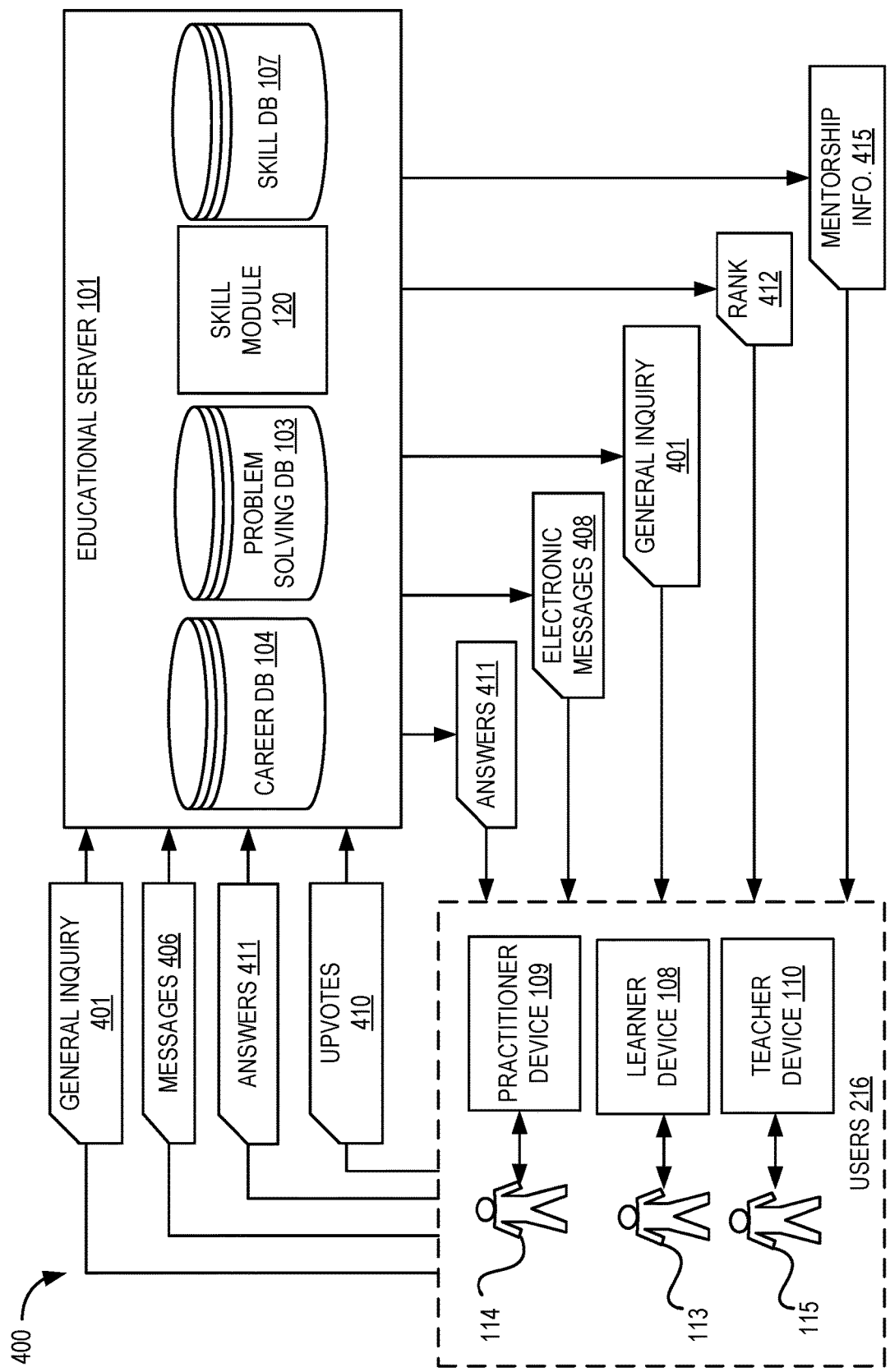
FIG. 4 illustrates an example educational posting process that may be implemented in the online educational system of FIG. 1.

FIG. 4 illustrates an example educational posting process 400 that may be implemented in the online educational system 100 of FIG. 1. The educational posting process 400 may enable additional interaction between the users 216. The interaction described in the educational posting process 400 may supplement the inquiry/response process 300 of FIG. 3 and the pairing process 200 of FIG. 2.

FIG. 4 includes multiple components and entities (e.g., 101, 109, 108, 110, 114, 113, 115, and 113) described with reference to FIGS. 1-3. Although not explicitly depicted in FIG. 4, communication between the users 216 and the educational server 101 may be via a communication network such as the network 122 of FIG. 1.

The educational posting process 400 of FIG. 4 is described in combination with the user interface device 504 of FIG. 5. Referring to FIG. 5, in the user interface device 504 a forum 502 may be displayed on the devices 108/109/110. The forum 502 may generally enable the users 216 to interface with one another via communication of messages 406 from the users 216 that are posted as electronic messages 408 on the forum 502. The electronic messages 408 may include any type of message communicated by the users (e.g., the users 216). General inquiry 401 and answers 411 may be examples of the messages 406 and the electronic messages 408 in some embodiments.

In some embodiments, the educational server 101 may be configured to provide or display the forum 502 in the user interface device 504 of the online educational system. Additionally or alternatively, the educational server 101 may be configured to enable the users 216 to proceed to the forum 502 in the user interface device 504 of the online educational system or the educational server 101 may be configured to shift content displayed by the online educational system to the forum. For instance, the items displayed to the users 216 may shift to the forum 502 from one or more other items. The forum 502 may be organized according to the skill item 203, the real-world problem item 205, the career item 207, or some combination thereof.

In FIG. 4, one or more of the users 216 may communicate a general inquiry 401 to the educational server 101. The general inquiry 401 may be communicated from the practitioner device 109, the learner device 108, or the teacher device 110. For example, the learner 113 may provide input to the learner device 108. In response, the learner device 108 may communicate the general inquiry 401 to the educational server 101.

The general inquiry 401 may include a question that does not specifically identify one or more of the career items in the career database 104, one or more of the skill items in the skill database 107, or one or more real-world problem item 205 in the problem solving database 103. In response to the general inquiry 401, the skill module 120 may be configured to communicate the general inquiry 401 to one or more of the devices 108/109/110. The general inquiry 401 may be displayed in a forum such that the user 216 may view the general inquiry 401.

Following display of the general inquiry 401 in the user interface device, one or more of the users 216 may communicate one or more answers 411 to the educational server 101. The answers 411 may be communicated from the practitioner device 109, the learner device 108, or the teacher device 110. For example, the practitioner 114 may provide input to the practitioner device 109. In response, the practitioner device 109 may communicate the answers 411 to the educational server 101. The answers 411 may then be communicated from the educational server 101 to the devices 108/109/110. The devices 108/109/110 may display the two or more answers 411 in the user interface device and/or the forum of the online educational system.

With reference to FIG. 5, the general inquiry 401, which may be communicated from the educational server 101, may be displayed on the forum 502. Accordingly, the general inquiry 401 may be visible to the users 216 that are interfacing with the forum 502. For example, with reference to FIGS. 4 and 5, the learner 113 may have a general question that she communicates in the general inquiry 401 to the educational server 101. The educational server 101 may then communicate the general inquiry 401 that is posted on the forum 502 and that may be displayed on the user interface device 504 of one or more of the devices 108/109/110.

Following the display of the general inquiry 401, one or more of the users 216 may communicate answers 411. As described above, the answers 411 may be communicated to the educational server 101. The educational server 101 may then communicate the answers 411 to the devices 108/109/110 for display on the forum 502. Accordingly, the user 216 (e.g., the learner 113) may have a general question, which is post to the forum 502 as the general inquiry 401. The answers 411 to the general inquiry 401 may then be posted or displayed to the forum 502. The answers 411 may be visible to the user 216 who had the general inquiry 401. Thus, the user 216 may interface with the other users 216 to seek and receive answers (e.g., the answers 411) to general inquiries (e.g., the general inquiry 401).

With reference to FIG. 4, upvotes 410 may be communicated from the users 216. The upvotes 410 may include a message such as a vote, a 'thumbs-up', or a 'like'. The upvote 410 may be submitted in support of one or more of the answers 411 and/or a real-world problem item (e.g., 205). For instance, the practitioner 114 may submit the answer 411 to the general inquiry 401. The answer 411 and the general inquiry 401 may be posted on the forum 502. The teacher 115 and/or the learner 113 may communicate the upvotes 410 to the educational server 101 if they think the answer 411 is appropriate or otherwise beneficial.

The educational server 101 may associate the upvotes 410 with the particular user who communicated the answer 411 and/or the real-world problem item 205. A rank 412 of the particular user may increase in response to the upvotes 410. The rank 412 may be used to formulate mentorship relationships between two or more of the users 216.

From the example above, following the communication of the upvotes 410, the rank 412 of the practitioner 114 may increase. For instance, the rank 412 may include a range from 1 to 10. Prior to the upvotes 410, the rank 412 of the practitioner 114 may have a rank 412 of four. Following the upvotes 410, the rank 412 of the practitioner 114 may increase to five or six. Following the increase in the rank 412, the practitioner 114 may then be considered for a mentor relationship. When the user 216 is considered for a mentor relationship, the education server 101 may generate mentorship information 415 (in FIG. 4 "mentorship info."). In some embodiments, the mentorship information 415 may include identities, contact information, mentorship authorization, and the like. The educational server 101 may communicate or enable access to the rank 412 and/or mentorship information.

In some embodiments, to be considered for a mentor relationship, the rank 412 must exceed a threshold. For instance, the threshold may be five of a possible ten. In response to the increase in the rank 412, one of the users 216 may be considered for a mentor relationship.

Figure 6:
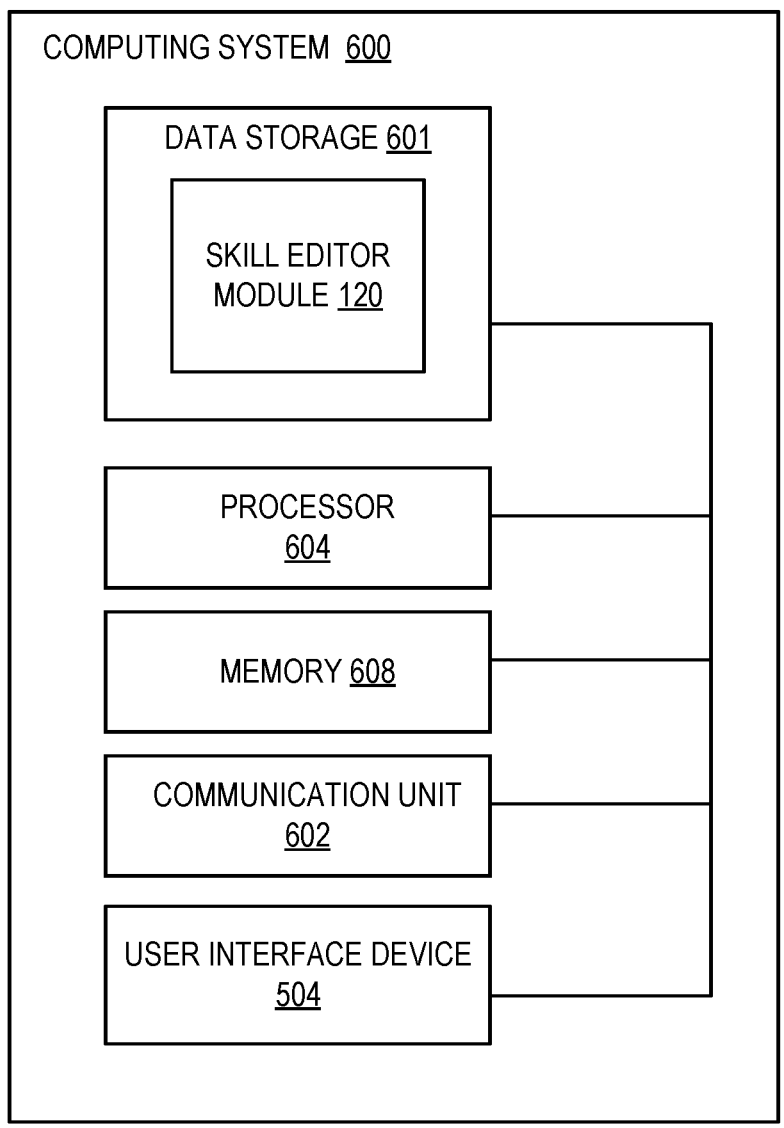
FIG. 6 illustrates an example computing system configured for learner engagement in the online educational system of FIG. 1.

FIG. 6 illustrates an example computing system 600 configured for learner engagement in an online educational system. The computing system 600 may be implemented in the online educational system 100 of FIG. 1, for instance. Examples of the computing system 600 may include the educational server 101 or the devices 108/109/110. The computing system 600 may include one or more processors 604, a memory 608, a communication unit 602, the user interface device 504, and a data storage 601 that includes the skill module 120.

The processor 604 may include any suitable special-purpose or general-purpose computer, computing entity, or processing device including various computer hardware or software modules and may be configured to execute instructions stored on any applicable computer-readable storage media. For example, the processor 604 may include a microprocessor, a microcontroller, a digital signal processor (DSP), an ASIC, an FPGA, or any other digital or analog circuitry configured to interpret and/or to execute program instructions and/or to process data.

Although illustrated as a single processor in FIG. 6, the processor 604 may more generally include any number of processors configured to perform individually or collectively any number of operations described in the present disclosure. Additionally, one or more of the processors 604 may be present on one or more different electronic devices or computing systems. In some embodiments, the processor 604 may interpret and/or execute program instructions and/or process data stored in the memory 608, the data storage 601, or the memory 608 and the data storage 601. In some embodiments, the processor 604 may fetch program instructions from the data storage 601 and load the program instructions in the memory 608. After the program instructions are loaded into the memory 608, the processor 604 may execute the program instructions.

The memory 608 and the data storage 601 may include computer-readable storage media for carrying or having computer-executable instructions or data structures stored thereon. Such computer-readable storage media may include any available media that may be accessed by a general-purpose or special-purpose computer, such as the processor 604. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 604 to perform a certain operation or group of operations.

The communication unit 602 may include one or more pieces of hardware configured to receive and send communications. In some embodiments, the communication unit 602 may include one or more of an antenna, a wired port, and modulation/demodulation hardware, among other communication hardware devices. In particular, the communication unit 602 may be configured to receive a communication from outside the computing system 600 and to present the communication to the processor 604 or to send a communication from the processor 604 to another device or network (e.g., 122 of FIG. 1).

The user interface device 504 may include one or more pieces of hardware configured to receive input from and/or provide output to a user. In some embodiments, the user interface device 504 may include one or more of a speaker, a microphone, a display, a keyboard, a touch screen, or a holographic projection, among other hardware devices.

The skill module 106 may include program instructions stored in the data storage 601. The processor 604 may be configured to load the skill module 106 into the memory 608 and execute the skill module 106. Alternatively, the processor 604 may execute the skill module 106 line-by-line from the data storage 601 without loading them into the memory 608. When executing the skill module 106, the processor 604 may be configured to perform a participation verification process as described elsewhere in this disclosure.

Modifications, additions, or omissions may be made to the computing system 600 without departing from the scope of the present disclosure. For example, in some embodiments, the computing system 600 may not include the user interface device 504. In some embodiments, the different components of the computing system 600 may be physically separate and may be communicatively coupled via any suitable mechanism. For example, the data storage 601 may be part of a storage device that is separate from a server, which includes the processor 604, the memory 608, and the communication unit 602, that is communicatively coupled to the storage device.

Figure 7A:
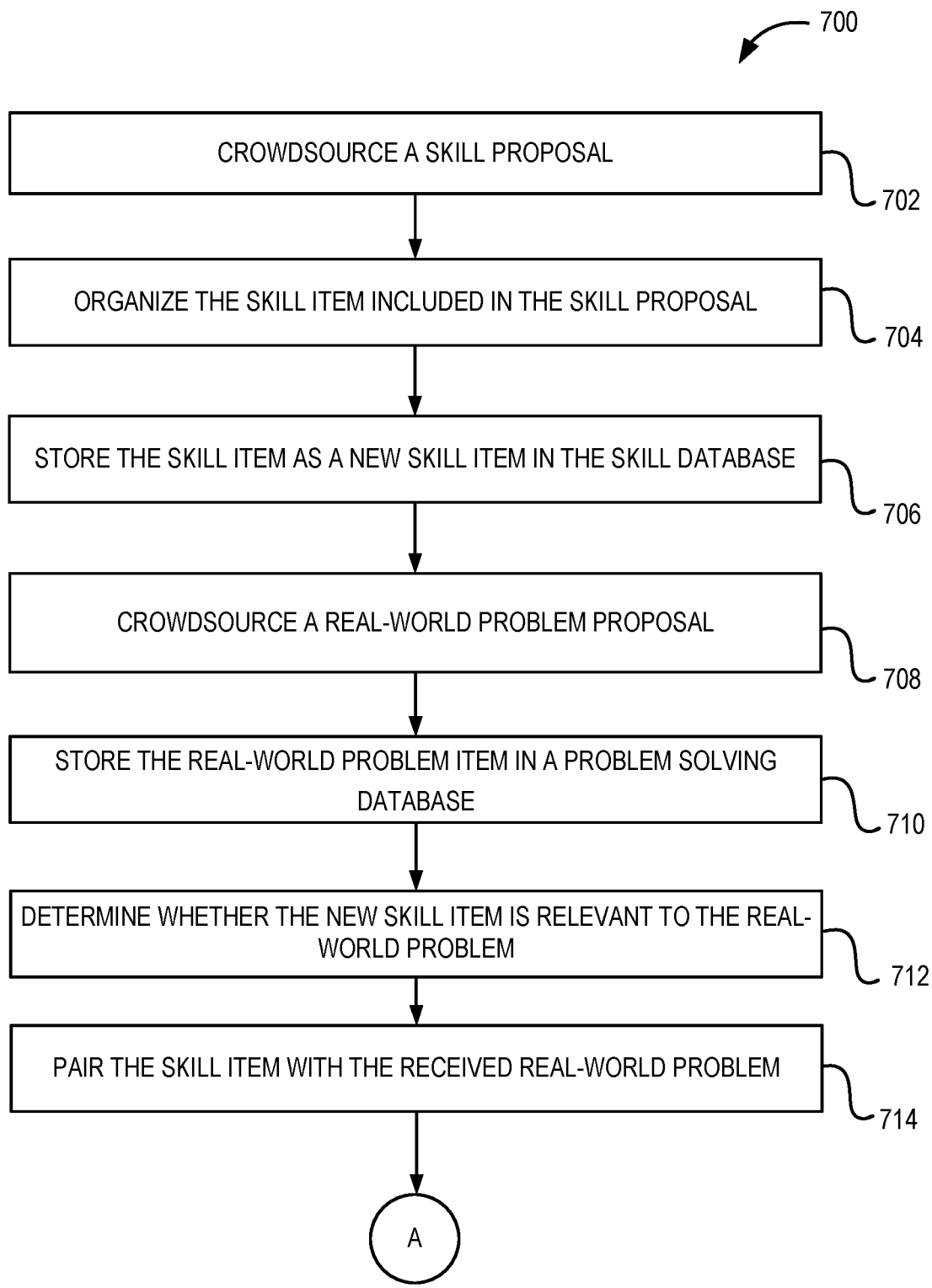
FIGS. 7A-7C are a flow chart of an example method of learner engagement.
Figure 7B:
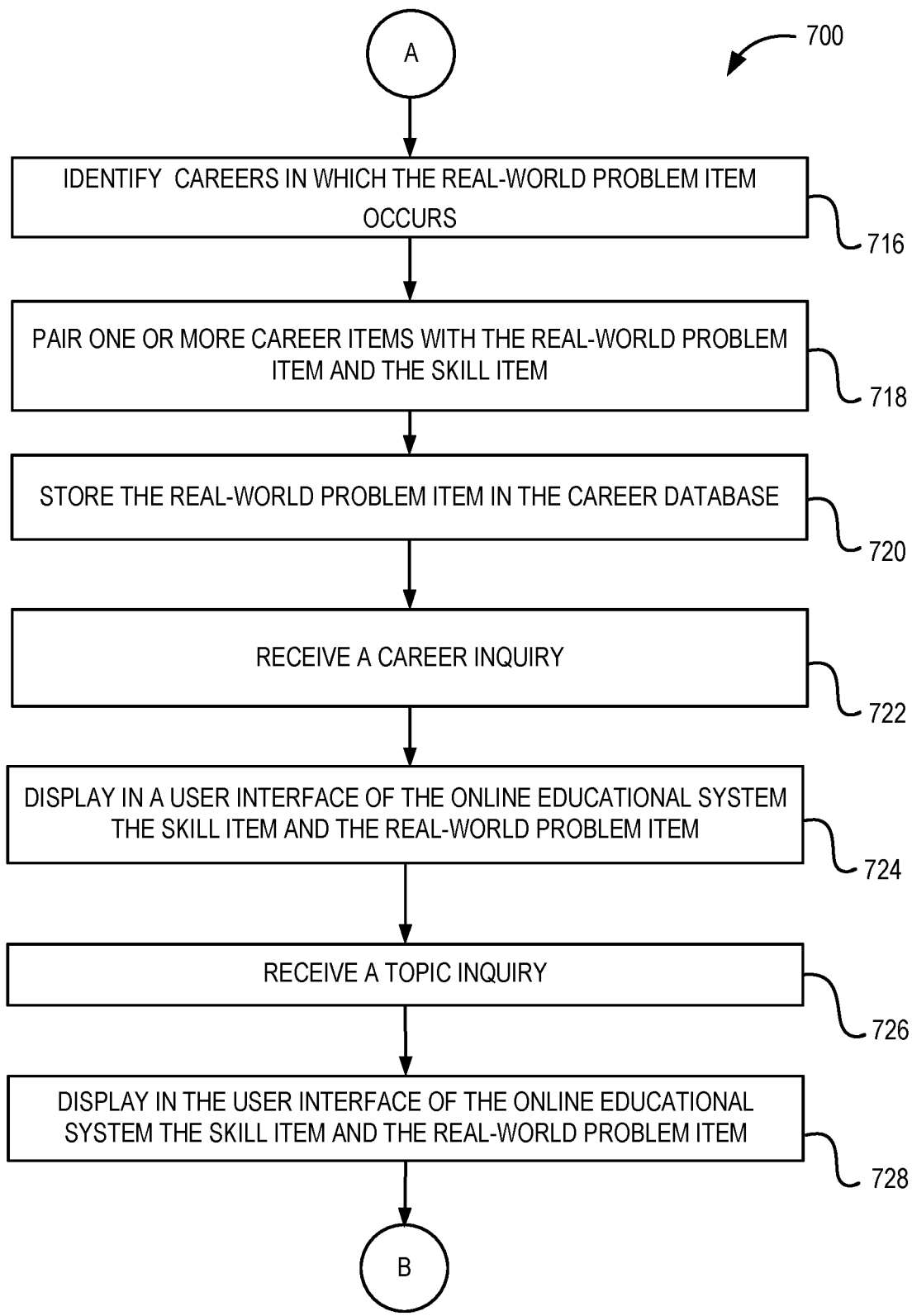
Figure 7C:
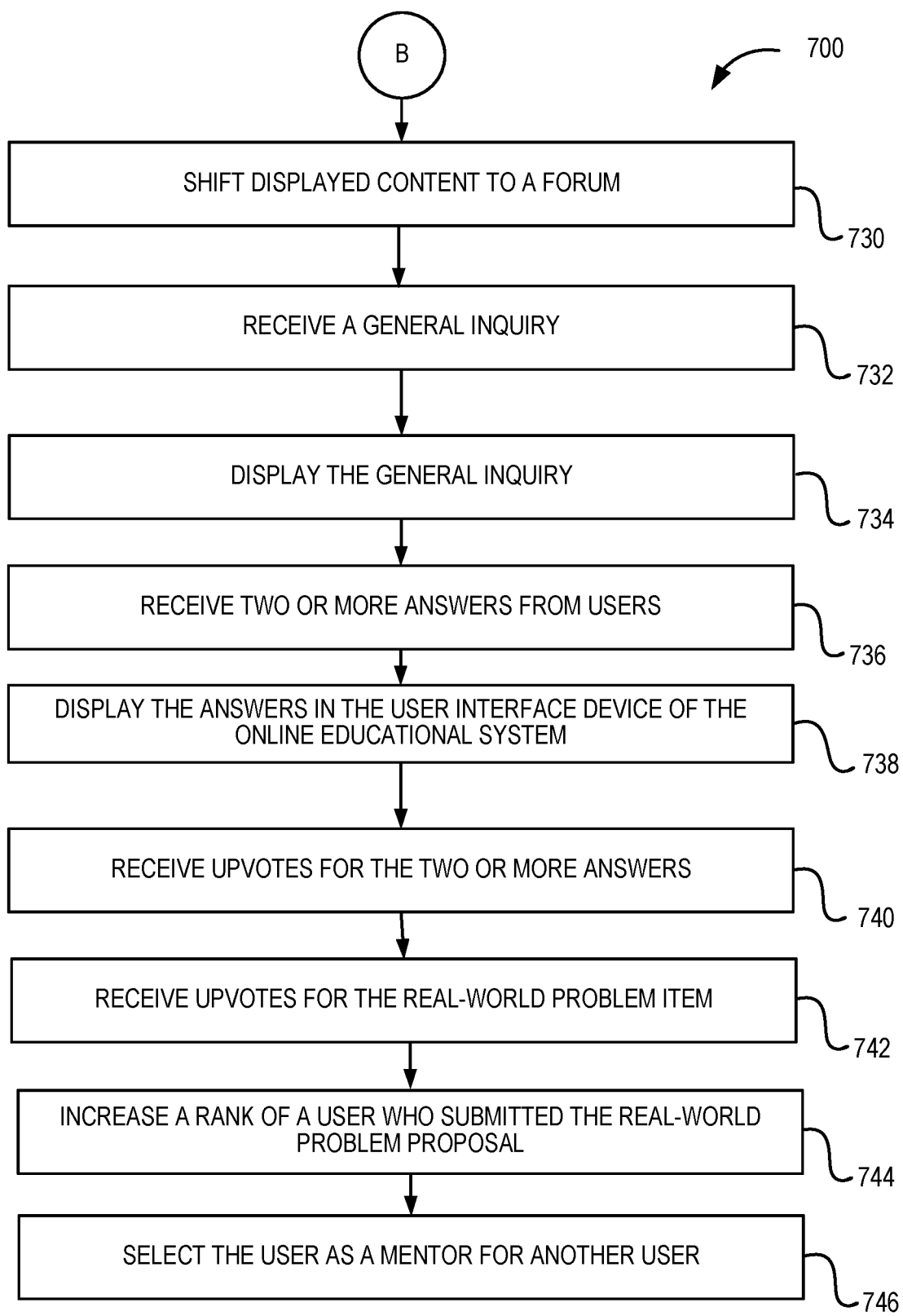

FIGS. 7A-7C are a flow chart of an example method 700 of learner engagement. The method 700 may be performed in an online educational system such as the online educational system 100 of FIG. 1. The method 700 may be programmably performed in some embodiments by the educational server 101 and/or the devices 108/109/110 described with reference to FIGS. 1-5. In some embodiments, the educational server 101 and/or the devices 108/109/110 or another computing system may include or may be communicatively coupled to a non-transitory computer-readable medium (e.g., the memory 608 of FIG. 6) having stored thereon programming code or instructions that are executable by one or more processors (such as the processor 604 of FIG. 6) to cause a computing system and/or the educational server 101 and/or the devices 108/109/110 to perform or control performance of the method 700. Additionally or alternatively, the educational server 101 and/or the devices 108/109/110 may include the processor 604 described elsewhere in this disclosure that is configured to execute computer instructions to cause the educational server 101 and/or the devices 108/109/110 or another computing system to perform or control performance of the method 700. Although illustrated as discrete blocks, various blocks in FIGS. 7A-7C may be divided into additional blocks, combined into fewer blocks, or eliminated, depending on the desired implementation.

Referring to FIG. 7A, the method 700 may begin at block 702. At block 702, a skill proposal may be crowdsourced from one or more users of an online educational system. The skill proposal may be crowdsourced via a communication network. The skill proposal may include a skill item that describes an exercise related to an educational concept. In some embodiments, a server such as the educational server 101 of FIGS. 1-5 may be configured to crowdsource the skill proposal. At block 704, the skill item included in the skill proposal may be organized relative to other skill items that are stored in a skill database. In some embodiments, the skill item may be organized with the other skill items in a topic-based hierarchy. For example, topics that are broad may be organized in a higher or broader level of the hierarchy than topics that are narrow or sub-topics. In some embodiments, a server such as the educational server 101 of FIGS. 1-5 may be configured to organize the skill item.

At block 706, the skill item may be stored in the skill database according to the organization. For example, in circumstances in which the skill item includes a broad topic, other skill items may be organized as sub-topics in a lower level of the hierarchy than the skill item. Additionally or alternatively, the skill item may include a narrow topic. In these and other circumstance, the skill item may be stored as a sub-topic. In some embodiments, a server such as the educational server 101 of FIGS. 1-5 may be configured to store the skill item.

At block 708, a real-world problem proposal may be crowdsourced. The real-world problem proposal may be crowdsourced from the one or more users. The real-world problem proposal may be crowdsourced via the communication network. The real-world problem proposal may include a real-world problem item that includes one or more technical issues that occur in at least one career. In some embodiments, a server such as the educational server 101 of FIGS. 1-5 may be configured to store the skill item.

At block 710, the real-world problem item may be stored in a problem solving database. In some embodiments, a server such as the educational server 101 of FIGS. 1-5 may be configured to store the real-world problem item. At block 712, it may be determined whether the skill item is relevant to the real-world problem item based on application of the educational concept of the skill item to technical issues of the real-world problem item. In some embodiments, a server such as the educational server 101 of FIGS. 1-5 may be configured to determine whether the skill item is relevant to the real-world problem item.

At block 714, the skill item may be paired with the real-world problem item. In some embodiments, the skill item may be paired with the real-world problem item in response to a determination that the skill item is relevant to the real-world problem item. In some embodiments, a server such as the educational server 101 of FIGS. 1-5 may be configured to pair the skill item with the real-world problem item.

With reference to FIG. 7B, in block 716 careers in which the real-world problem item occurs may be identified. At block 718, one or more career items may be paired with the skill item and/or the real-world problem item. For example, one or more careers in a career database that correspond to careers in which the real-world problem item occurs may be paired with the skill item and the real-world problem item. At block 720, the real-world problem item may be stored in the career database. At block 722, a career inquiry may be received. For example, the career inquiry may be received from a device that is associated with a user via the communication network. The career inquiry may identify at least one of the careers in which the real-world problem item occurs. At block 724, the skill item and the real-world problem item may be displayed or be caused to be displayed. For instance, the skill item and the real-world problem item may be displayed in response to the career inquiry. The skill item and/or the real-world problem item may be displayed in a user interface device of the online educational system.

At block 726, a topic inquiry may be received. The topic inquiry may be received from a device that is associated with a user via the communication network. The topic inquiry may identify the skill item. At block 728, the skill item and the real-world problem item may be displayed or may be caused to be displayed. The skill item and the real-world problem item may be displayed in response to the topic inquiry. In some embodiments, the skill item and the real-world problem item may be displayed in the user interface device of the online educational system.

With reference to FIG. 7C, at block 730, content displayed may shift to a forum. The forum may be provided or displayed in the user interface device of the online educational system. For example, after display of the skill item and the real-world problem item, content including the skill item and the real-world problem item may shift or change to the forum, which may be displayed in the user interface device of the online educational system.

The forum may be organized according to the skill item, the real-world problem item, the career, or some combination thereof. In some embodiments, the forum may enable one or more posts of electrical messages by the users. At block 732, a general inquiry may be received. The general inquiry may be received from a device that is associated with a user via the communication network. At block 734, the general inquiry or an electronic representation thereof may be displayed. For example, in response to receipt of the general inquiry, the general inquiry may be displayed in the user interface device and/or in the forum of the online educational system. The general inquiry may be displayed such that the general inquiry is visible to one or more other users.

At block 736, two or more answers may be received from the users. For example, following display of the general inquiry in the user interface device, two or more answers from users may be received. At block 738, two or more answers may be displayed or caused to be displayed. The two or more answers may be displayed in the user interface device and/or the forum of the online educational system. At block 740, upvotes for the two or more answers may be received. The upvotes for the answers may be received from multiple users. At block 742, one or more upvotes may be received. The upvotes may be received from multiple users. The upvotes may be received for the real-world problem item and/or the real-world problem proposal. At block 744, a rank of a user may be increased. For instance, in response to the upvotes, the rank of the user who submitted the real-world problem proposal may be increased. At block 746, the user may be selected as a mentor for another user. The user may be selected in response to the rank of the user meeting or exceeding a particular threshold. For example, the rank may provide points to one or more practitioners in the community of practitioners relative to one another. For instance, the practitioner may be ranked on a scale of 1 to 10. In response to the rank indicating that a particular practitioner of a community of practitioner is high relative to other practitioners (e.g., a 7 out of 10), the practitioner may be selected as a mentor for one of the learners (e.g., 113 of FIG. 1).

Figure 8A:
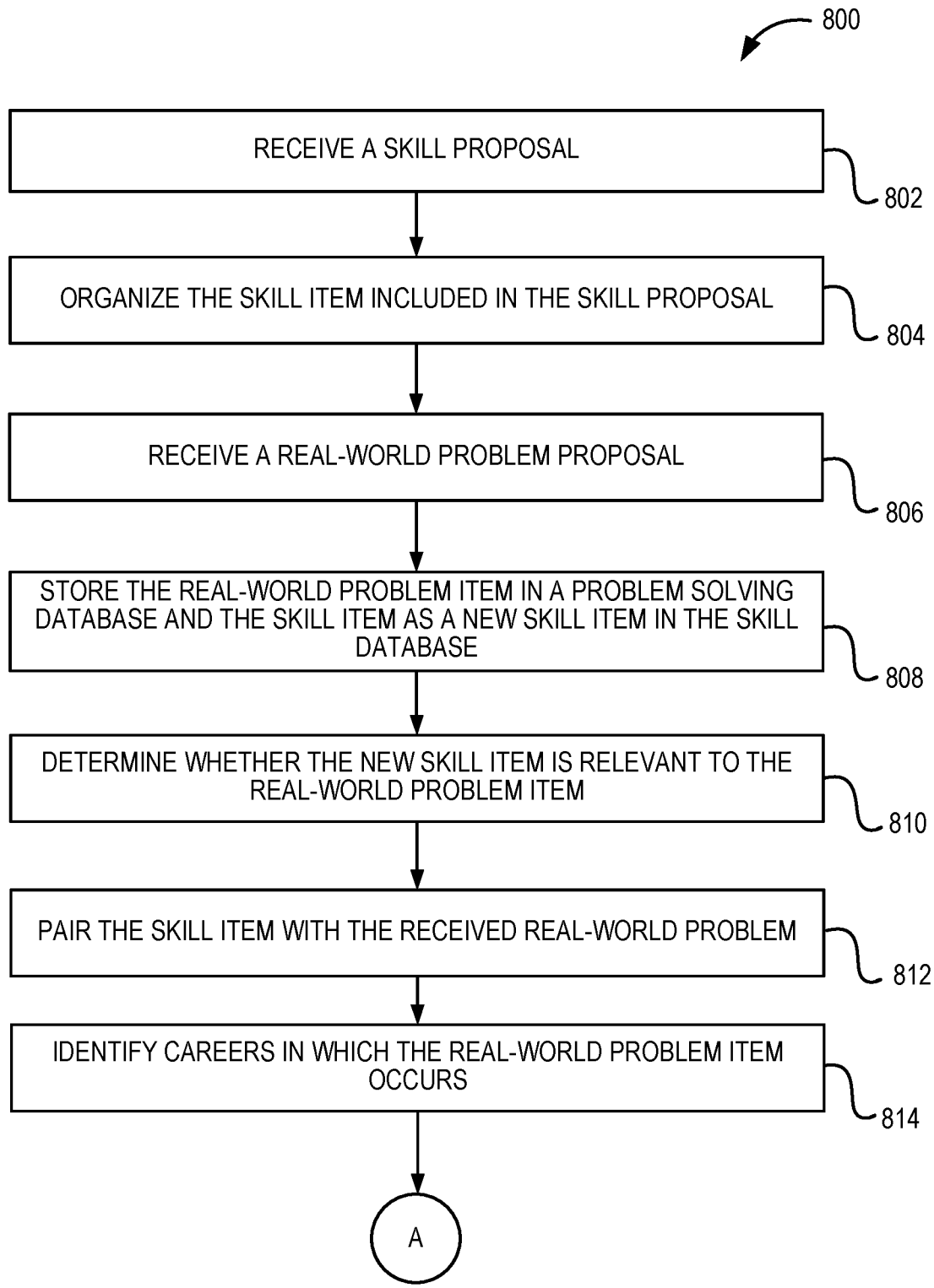
FIGS. 8A-8C are a flow chart of another example method of learner engagement, all arranged in accordance with at least one embodiment described herein.
Figure 8B:
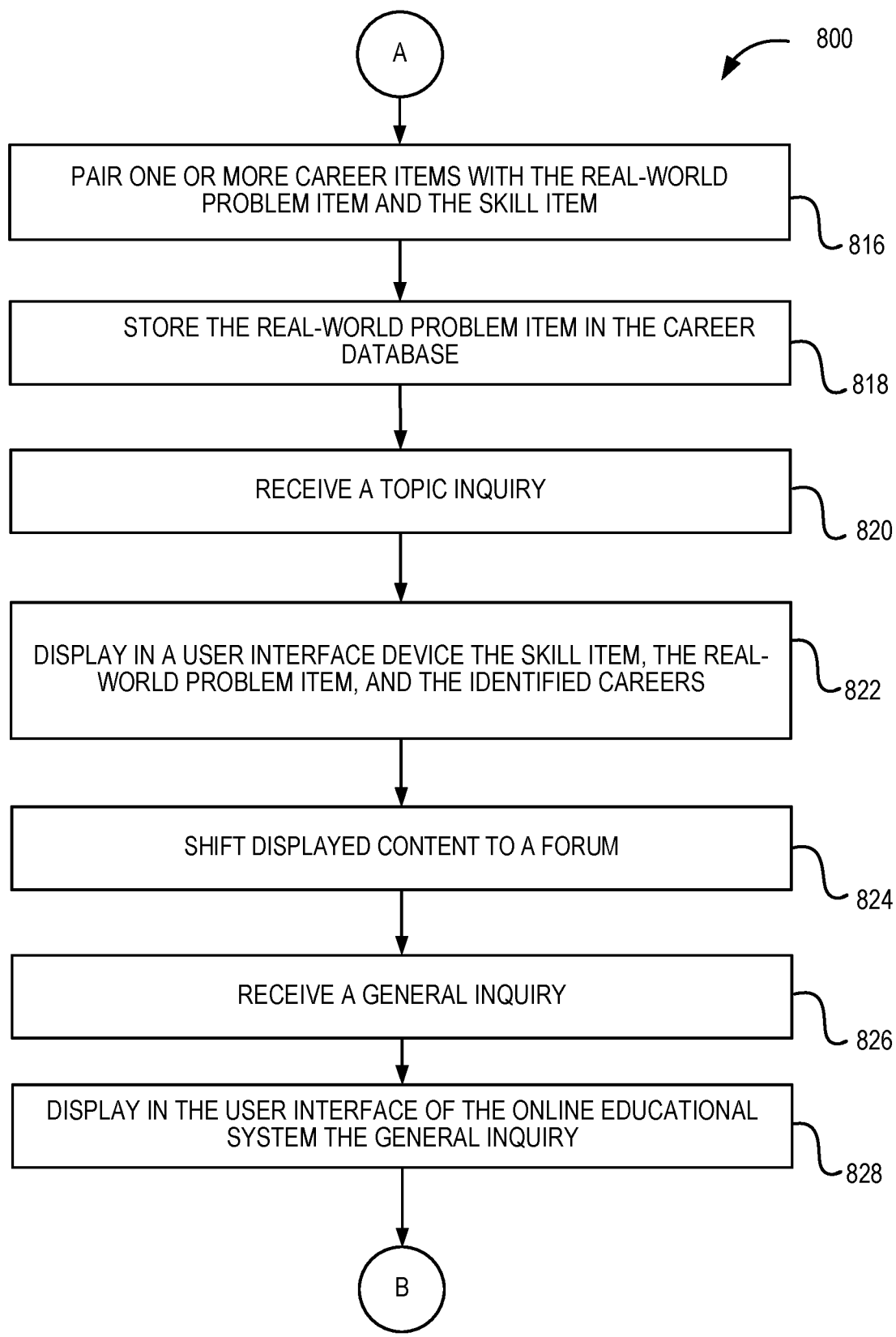
Figure 8C:
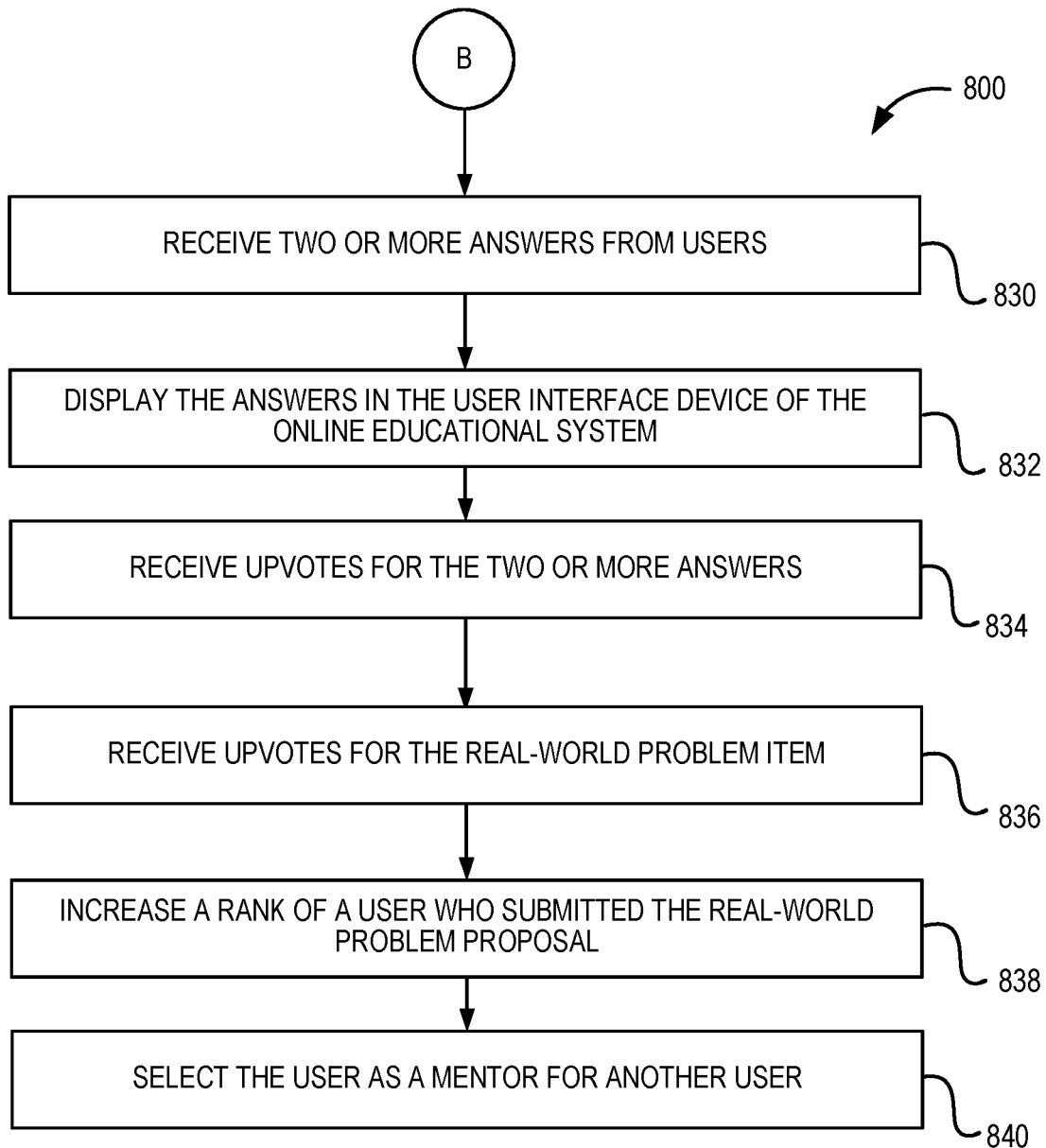

FIGS. 8A-8C are a flow chart of another example method 800 of learner engagement. The method 800 may be performed in an online educational system such as the online educational system 100 of FIG. 1. The method 800 may be programmably performed in some embodiments by the educational server 101 and/or the devices 108/109/110 described with reference to FIGS. 1-5. In some embodiments, the educational server 101 and/or the devices 108/109/110 or another computing system may include or may be communicatively coupled to a non-transitory computer-readable medium (e.g., the memory 608 of FIG. 6) having stored thereon programming code or instructions that are executable by one or more processors (such as the processor 604 of FIG. 6) to cause a computing system and/or the educational server 101 and/or the devices 108/109/110 to perform or control performance of the method 800. Additionally or alternatively, the educational server 101 and/or the devices 108/109/110 may include the processor 604 described elsewhere in this disclosure that is configured to execute computer instructions to cause the educational server 101 and/or the devices 108/109/110 or another computing system to perform or control performance of the method 800. Although illustrated as discrete blocks, various blocks in FIGS. 8A-8C may be divided into additional blocks, combined into fewer blocks, or eliminated, depending on the desired implementation.

Referring to FIG. 8A, the method 800 may begin at block 802. At block 802, a skill proposal may be received. The skill proposal may be received from a device that is associated with one or more users of an online educational system. The skill proposal may be received via a communication network. The skill proposal may be crowdsourced by the educational server. The skill proposal may include a skill item that describes an exercise related to an educational concept. In some embodiments, the one or more users may include a community of practitioners, a community of learners, a community of teachers, or some combination thereof.

At block 804, the skill item included in the skill proposal may be organized. The skill item may be organized relative to other skill items that are stored in a skill database. The skill item may be organized with the other skill items in a topic-based hierarchy. The skill item may be stored in the skill database according to the organization.

At block 806, a real-world problem proposal may be received. The real-world problem proposal may be received from a device associated with the one or more users via the communication network. The real-world problem proposal may be crowdsourced by the educational server. The real-world problem proposal may a real-world problem item that includes one or more technical issues that occur in at least one career. At block 808, the real-world problem item may be stored in a problem solving database and/or the skill item in the skill database.

At block 810, it may be determined whether the skill item is relevant to the real-world problem item. Relevance of the skill item to the real-world problem item may be based at least partially on application of the educational concept of the skill item to the real-world problem. At block 812, the skill item may be paired with the received real-world problem item. For example, the skill item may be paired with the real-world problem item in response to a determination that the skill item is relevant to the real-world problem.

At block 814, careers in which the real-world problem item occurs may be identified. In some embodiments, identification of the careers in which the real-world problem item occurs may be crowdsourced from one or more of the users. With reference to FIG. 8B, at block 816, one or more career items may be paired with the real-world problem item and/or the skill item. For example, the one or more career items in a career database that correspond to the identified careers in which the real-world problem item occurs may be paired with the skill item and/or the real-world problem item.

At block 818, the real-world problem item may be stored in the career database. At block 820, a topic inquiry may be received. For example, the topic inquiry may be received from a device that is associated with a learner via the communication network. The topic inquiry may identify the skill item. At block 822, the skill item, the real-world problem item, and the identified careers or some combination thereof may be displayed or may be caused to be displayed. The skill item, the real-world problem item, and the identified careers or some combination thereof may be displayed or may be caused to be displayed in response to the topic inquiry that identifies the skill item. For instance, the skill item, the real-world problem item, and the identified careers may be displayed in user interface device of the online educational system in response to the topic inquiry. At block 824, content displayed may shift to a forum. The forum may be provided or displayed in the user interface device of the online educational system. For example, after display of the skill item, the real-world problem item, and the identified careers, content including the skill item, the real-world problem item, and the identified careers, may shift or change to the forum, which may be displayed in the user interface device of the online educational system. The forum may be organized according to the skill item, the real-world problem item, the career, or some combination thereof. In some embodiments, the forum may enable one or more posts of electrical messages by the users.

At block 826, a general inquiry may be received. The general inquiry may be received from a device that is associated with a user via the communication network. At block 828, the general inquiry or an electronic representation thereof may be displayed. For example, in response to receipt of the general inquiry, the general inquiry may be displayed in the user interface device and/or in the forum of the online educational system. The general inquiry may be displayed such that the general inquiry is visible to one or more other users.

Referring to FIG. 8C, at block 830, two or more answers may be received from the users. For example, following display of the general inquiry in the user interface device, two or more answers from users may be received. At block 832, two or more answers may be displayed or caused to be displayed. The two or more answers may be displayed in the user interface device and/or the forum of the online educational system. At block 834, upvotes for the two or more answers may be received. The upvotes for the answers may be received from multiple users. At block 836, one or more upvotes may be received. The upvotes may be received from multiple users. The upvotes may be received for the real-world problem item and/or the real-world problem proposal.

At block 838, a rank of a user may be increased. For instance, in response to the upvotes, the rank of the user who submitted the real-world problem proposal may be increased. At block 840, the user may be selected as a mentor for another user. The user may be selected in response to the rank of the user meeting or exceeding a particular threshold. For example, the rank may provide points to one or more practitioners in the community of practitioners relative to one another. For instance, the practitioner may be ranked on a scale of 1 to 10. In response to the rank indicating that a particular practitioner of a community of practitioner is high relative to other practitioners (e.g., a 7 out of 10), the practitioner may be selected as a mentor for one of the learners (e.g., 113 of FIG. 1).

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include tangible or non-transitory computer-readable storage media including RAM, ROM, EEPROM, CD-ROM or other optical disk storage, magnetic disk storage or other magnetic storage devices, or any other non-transitory storage medium which may be used to carry or store desired program code in the form of computer-executable instructions or data structures and which may be accessed by a general-purpose or special-purpose computer. Combinations of the above may also be included within the scope of computer-readable media.

Computer-executable instructions comprise, for example, instructions and data which cause a general-purpose computer, special-purpose computer, or special-purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module," "component," and/or "engine" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modules running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present invention have been described in detail, it should be understood that the various changes, substitutions, and alterations could be made hereto without departing from the spirit and scope of the invention.

The invention claimed is:

1. A method of learner engagement, the method comprising:

crowdsourcing, by an educational server as a component of an online educational system and comprising one or more processors, a skill proposal comprising an electrical representation of a document, data, or information that is received from one or more users of an online educational system via a communication network, the skill proposal being crowdsourced via a communication network;

parsing, by the one or more processors of the educational server, the skill proposal to identify at least one skill item that describes an exercise related to an educational concept;

organizing, by the one or more processors of the educational server, the skill item included in the skill proposal relative to other skill items that are stored in a skill database, the skill item being organized with the other skill items in a topic-based hierarchy of corresponding educational concepts;

storing, by the one or more processors of the educational server, the skill item in the skill database according to the topic-based hierarchy relative to the other skill items;

crowdsourcing, by the one or more processors of the educational server, a real-world problem proposal from the one or more users, the real-world problem proposal being crowdsourced via the communication network, the real-world problem proposal including a real-world problem item that includes one or more technical issues that occur in at least one of a plurality of careers;

storing, by the one or more processors of the educational server, the real-world problem item in a problem solving database;

determining, by the one or more processors of the educational server, whether the skill item is relevant to the real-world problem item based on application of the educational concept of the skill item to the technical issues of the real-world problem item;

in response to a determination that the skill item is relevant to the real-world problem item, pairing, by the one or more processors of the educational server, the skill item with the real-world problem item;

receiving, by the one or more processors of the educational server, a career inquiry from a device that is associated with a user of the one or more users via the communication network, the career inquiry identifying at least one of the careers in which the real-world problem item occurs;

in response to the career inquiry, displaying in a user interface device of the online educational system the skill item and the real-world problem item;

receiving, by the one or more processors of the educational server, a topic inquiry from the device that is associated with the user via the communication network, the topic inquiry identifying the skill item; and in response to the topic inquiry, displaying in the user interface device of the online educational system the skill item and the real-world problem item.

2. The method of claim 1, further comprising:
identifying, by the educational server, a career in which the real-world problem item occurs;
further pairing, by the educational server, one or more career items in a career database that correspond to the identified career with the real-world problem item and the skill item; and
storing, by the educational server, the real-world problem item in the career database.

3. The method of claim 1, further comprising shifting content displayed in the user interface device of the online educational system to a forum, wherein the forum is organized according to the skill item, the real-world problem item, the career, or some combination thereof, and wherein the forum enables posts of electrical messages by the users.

4. The method of claim 3, further comprising:
receiving, by the educational server, a general inquiry from the device that is associated with the user via the communication network; and
in response to the general inquiry, displaying in the user interface device of the online educational system the general inquiry such that the general inquiry is visible to one or more other users.

5. The method of claim 4, further comprising:
following display of the general inquiry in the user interface device, receiving two or more answers from one or more users of the online educational system;
displaying the two or more answers in the user interface device of the online educational system; and
receiving from the one or more users, upvotes for the two or more answers.

6. A method of learner engagement, the method comprising:

crowdsourcing, by an educational server as a component of an online educational system and comprising one or processors, a skill proposal comprising an electrical representation of a document, data, or information that is received from one or more users of an online educational system via a communication network, the skill proposal being crowdsourced via a communication network;

parsing, by the one or more processors of the educational server, the skill proposal to identify at least one skill item that describes an exercise related to an educational concept;

organizing, by the one or more processors of the educational server, the skill item included in the skill proposal relative to other skill items that are stored in a skill database, the skill item being organized with the other skill items in a topic-based hierarchy of corresponding educational concepts;

storing, by the one or more processors of the educational server, the skill item in the skill database according to the topic-based hierarchy relative to the other skill items;

crowdsourcing, by the one or more processors of the educational server, a real-world problem proposal from the one or more users, the real-world problem proposal being crowdsourced via the communication network, the real-world problem proposal including a real-world problem item that includes one or more technical issues that occur in at least one of a plurality of careers;

storing, by the one or more processors of the educational server, the real-world problem item in a problem solving database;

determining, by the one or more processors of the educational server, whether the skill item is relevant to the real-world problem item based on application of the educational concept of the skill item to the technical issues of the real-world problem item;

in response to a determination that the skill item is relevant to the real-world problem item, pairing, by the one or more processors of the educational server, the skill item with the real-world problem item receiving from one or more users of the online educational system, upvotes for the real-world problem item;

in response to the upvotes, increasing a rank of a user of the one or more users of the online educational system who submitted the real-world problem proposal;

receiving, by the one or more processors of the educational server, a career inquiry from a device that is associated with a user of the one or more users via the communication network, the career inquiry identifying at least one of the careers in which the real-world problem item occurs;

in response to the career inquiry, displaying in a user interface device of the online educational system the skill item and the real-world problem item;

receiving, by the one or more processors of the educational server, a topic inquiry from the device that is associated with the user via the communication network, the topic inquiry identifying the skill item; and in response to the topic inquiry, displaying in the user interface device of the online educational system the skill item and the real-world problem item.

7. The method of claim 6, further comprising in response to the rank of the user meeting a particular threshold, selecting the user as a mentor for another user.

8. A non-transitory computer-readable medium having encoded therein programming code executable by a processor to perform or control performance of operations of claim 1.

9. A non-transitory computer-readable medium having encoded therein programming code executable by one or more processors to perform or control performance of operations comprising:

receiving, by the one or more processors, a skill proposal comprising an electrical representation of a document, data, or information that is received from a device associated with one or more users of an online educational system via a communication network, the skill proposal being crowdsourced by an educational server and the skill proposal including a skill item that describes an exercise related to educational concept;

parsing, by the one or more processors, the skill proposal to identify at least one skill item that describes an exercise related to an educational concept;

organizing, by the one or more processors, the skill item included in the skill proposal relative to other skill items that are stored in a skill database, the skill item being organized with the other skill items in a topic-based hierarchy of corresponding educational concepts;

storing, by the one or more processors, the skill item in the skill database according to the topic-based hierarchy relative to the other skill items;

receiving, by the one or more processors, a real-world problem proposal from a device associated with the one or more users via the communication network, the real-world problem proposal being crowdsourced by the educational server and the real-world problem proposal including a real-world problem item that includes one or more technical issues that occur in at least one of a plurality of careers;

in response to a determination that the skill item is relevant to the real-world problem, pairing, by the one or more processors, the skill item with the received real-world problem;

identifying, by the one or more processors, a career in which the real-world problem item occurs;

further pairing, by the one or more processors, a career item in a career database that correspond to the identified career with the real-world problem item and the skill item;

receiving, by the one or more processors, a topic inquiry from a device that is associated with a learner via the communication network, the topic inquiry identifying the skill item;

in response to the topic inquiry, displaying, by the one or more processors, in a user interface device of the online educational system the skill item, the real-world problem item, and the identified careers;

receiving, by the one or more processors, a general inquiry from the device that is associated with the user via the communication network;

displaying in the user interface device of the online educational system the general inquiry such that the general inquiry is visible to one or more other users in response to the general inquiry;

following display of the general inquiry in the user interface device, receiving two or more answers from one or more users of the online educational system;

displaying the two or more answers in the user interface device of the online educational system; and receiving from the one or more users, upvotes for the two or more answers.

10. The non-transitory computer-readable medium of claim 9, wherein the operations further comprise storing, by the one or more processors, the real-world problem item in the career database relative to the career items of the identified career.

11. The non-transitory computer-readable medium of claim 9, wherein the operations further comprise determining, by the one or more processors, whether the skill item is relevant to the real-world problem based on application of the educational concept of the skill item to the real-world problem.

12. The non-transitory computer-readable medium of claim 11, wherein:

the operations further comprise shifting content displayed in the user interface device of the online educational system to a forum, the forum is organized according to the skill item, the real-world problem item, the career, or some combination thereof, and the forum enables posts of electrical messages by the users.

13. The non-transitory computer-readable medium of claim 9, wherein the operations further comprise:

receiving from multiple one or more users of the online educational system, upvotes for the real-world problem item; and in response to the upvotes, increasing, by the one or more processors, a rank of a particular user of the one or more users of the online educational system who submitted the real-world problem proposal.

14. The non-transitory computer-readable medium of claim 13, further comprising in response to the rank of the user meeting a particular threshold, selecting, by the one or more processors, the user as a mentor for the learner.

15. The non-transitory computer-readable medium of claim 9, wherein the one or more users include a community of practitioners, a community of learners, and a community of teachers.

* * * * *